US008542597B2

(12) United States Patent
DeCusatis et al.

(10) Patent No.: US 8,542,597 B2
(45) Date of Patent: *Sep. 24, 2013

(54) SOFT ERROR RECOVERY FOR CONVERGED NETWORKS

(71) Applicant: International Business Machines Corporation, Armonk, NY (US)

(72) Inventors: Casimer M DeCusatis, Poughkeepsie, NY (US); Thomas A Gregg, Highland, NY (US); Rajaram B Krishnamurthy, Wappingers Falls, NY (US); Aburadha Rao, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/726,673

(22) Filed: Dec. 26, 2012

(65) Prior Publication Data

US 2013/0114397 A1 May 9, 2013

Related U.S. Application Data

(63) Continuation of application No. 13/114,105, filed on May 24, 2011.

(51) Int. Cl.
H04L 12/28 (2006.01)

(52) U.S. Cl.
USPC ......................................................... 370/235

(58) Field of Classification Search
USPC .................. 370/229–231, 235, 236, 242, 252, 370/370/351, 389, 390, 392, 901, 902, 912, 370/216, 241, 244, 248, 250
See application file for complete search history.

(56) References Cited

U.S. PATENT DOCUMENTS

| 5,077,828 | A | * | 12/1991 | Waldroup | ..................... 455/514 |
| 6,985,975 | B1 | | 1/2006 | Chamdani et al. | |
| 8,238,288 | B2 | * | 8/2012 | Ahn | ............... 370/328 |
| 2005/0180345 | A1 | * | 8/2005 | Meier | ........... 370/310 |
| 2007/0160042 | A1 | * | 7/2007 | Dollo et al. | .................. 370/389 |
| 2009/0183260 | A1 | * | 7/2009 | Hernacki et al. | ................. 726/23 |
| 2012/0066435 | A1 | * | 3/2012 | Colgrove et al. | ............. 711/103 |
| 2012/0300611 | A1 | * | 11/2012 | DeCusatis et al. | ............ 370/216 |

OTHER PUBLICATIONS

International Search Report and Written Opinion dated Aug. 24, 2012, PCT/EP2012/059224.
Fiala "Detection and Correction of Silent Data Corruption for Large-Scale High-Performance Computing", IEEE International Parallel & Distributed Processing Symposium, May 16, 2011, pp. 2069-2072.
Wadekar et al. "Priority Grouping for DCB Networks (Enhanced Transmission Selection" Rev. 1.01, pp. 1-9.
Barrass et al "Proposal for Priority Based Flow Control", Rev. bb-pelissier-pfc-proposal-0508, May 8, 2008, pp. 1-9.

(Continued)

Primary Examiner — Omar Ghowrwal
(74) Attorney, Agent, or Firm — Steven Chiu

(57) ABSTRACT

Detecting and recovering from soft errors in a network comprising a first device. A first device receives a first data packet. Responsive to receiving a second data packet, the first device determines whether the two data packets are identical. Responsive to the determination that the two data packets are not identical, the first device discards the two data packets, and requests retransmission of the two data packets.

10 Claims, 7 Drawing Sheets

(56) References Cited

OTHER PUBLICATIONS

Wadekar et al "DCB Capability Exchange Protocol Base Specification", Rev. 1/01, pp. 1-5.

Angaluri et al, "Planning for Converged Fabrics—The Next Stop in Data Center Evolution", IBM Redboks, May 2010, REDP-4620-00, pp. 1/60.

* cited by examiner

SOFT ERROR RECOVERY FOR CONVERGED NETWORKS

CROSS REFERENCE TO RELATED APPLICATIONS

This application is a continuation of U.S. patent application Ser. No. 13/114,105 "SOFT ERROR RECOVERY FOR CONVERGED NETWORKS" filed May 24, 2011, the contents of which are incorporated by reference herein in their entirety.

BACKGROUND

The present invention relates, in general, to converged networks, and in particular, to soft error recovery.

There are two generally accepted definitions of errors in computer hardware and networks: soft errors and hard errors. Hard errors are the result of broken hardware, e.g. hardware with defects for one reason or another. These errors are repeatable. Soft errors are also know as transient errors and are usually not repeatable. Soft errors are random in nature and are caused by noise in the system such as high energy particles (alpha, beta, gamma, etc.), electrical interference, clock jitter, etc. Hardware's and network's susceptibility to soft errors is determined by the robustness of the design.

One major concern with errors, particularly in a datacenter network, is "silent data corruption" (SDC), which may be caused by either soft or hard error. The SDC refers to altered data that was undetected either due to insufficient or lack of checking mechanisms. In other words, SDC is the same as an undetected error that leads to data corruption. It should be noted that some undetected errors cause no problems, and are still considered SDC.

Current industry standard approaches for converged datacenter networks are susceptible to soft errors due to a variety of factors, including the high cost of radiation chamber testing and radiation hardening. This includes many of the new cloud data centers. Soft errors may occur because of radiation events, such as particle strikes, e.g. cosmic rays and alpha particles, interfering with the network. These radiation events may lead to transient errors in hardware and may lead to undetected state changes in software.

Soft errors in network switches may affect both the data plane, such as crossbar/shared memory and input/output switch ports, and the control plane, such as switch operating system (OS), of the switch. This may lead to multiple errors, including misrouting for gateway routers in a datacenter that may send packets to erroneous external locations, misclassification of packets, and misclassification of the availability of switches. Soft errors may also affect packet processing, compute and memory elements of a switch.

BRIEF SUMMARY

According to one embodiment of the present invention, a method, system, and program product is provided for detecting and recovering from soft errors in a network comprising a first device. A first device receives a first data packet. Responsive to receiving a second data packet, the first device determines whether the two data packets are identical. Responsive to the determination that the two data packets are not identical, the first device discards the two data packets, and requests retransmission of the two data packets.

According to one embodiment of the present invention, the network further comprises a second device. The second device generates the two data packets that are identical. The second device transmits the two data packets from the second device to the first device.

According to one embodiment of the present invention, generating the two data packets comprises inserting a tag into the two data packets to indicate that the two data packets are identical.

According to one embodiment of the present invention, the two data packets comprise an Ethernet field for storing the tag.

According to one embodiment of the present invention, determining whether the two data packets are identical comprises determining whether the two data packets arrive at the first device within a predetermined time interval; and determining whether the two data packets have identical content.

According to one embodiment of the present invention, the determination of whether the two data packets arrive at the first device within the predetermined time interval comprises determining whether the tags for the two data packets are identical.

According to one embodiment of the present invention, responsive to the determination that the two data packets did not arrive at the first device within the predetermined time interval, the first device discards the two data packets, and requests retransmission of the two data packets.

According to one embodiment of the present invention, responsive to the determination that only one of the two data packets (the first data packet or the second data packet) arrived at the first device within the predetermined time interval, the first device discards the arrived packet at the first device, and requests retransmission of the two data packets.

According to one embodiment of the present invention, the first device and the second device are virtual local area network (VLAN) enabled switches.

According to one embodiment of the present invention, the network is a Converged Enhanced Ethernet (CEE) network or a Fibre Channel over Ethernet (FCoE) network.

According to one embodiment of the present invention, responsive to the determination that the first data packet and said second data packet are identical, the first device processes the first data packet, the second data packet, or a combination thereof.

DETAILED DESCRIPTION

In accordance with an aspect of an embodiment of the present invention, a method, system, and computer program product is provided for detecting and recovering from soft errors in a network, e.g. a Converged Enhanced Ethernet (CEE) network or a Fibre Channel over Converged Enhanced Ethernet (FCoCEE) network. Specific details regarding CEE and FCoCEE can be found in IBM Redpaper: "Planning for Converged Fabrics The Next Step in Data Center Evolution" by Srihari Angaluri et al., 2010; CEE Authors: "Proposal for Priority Based Flow Control" by Hugh Barass et al, May 8, 2008; CEE Authors: "Priority Grouping for DCB Networks (Enhanced Transmission Selection) Rev 1.01" by Manoj Wadekar et al; and CEE Authors: "DCB Capability Exchange Protocol Base Specification Rev 1.01" by Manoj Wadekar et al; all incorporated herein by reference. In particular, devices in the network, e.g. hosts, network adapters, switches such as converged network and VLAN (Virtual Local Area Network) switches, etc., are configured to have a high availability option for the transmission of data packets (packets) to allow for soft error recovery across the network. A device is considered to be available when the device is operating correctly. A VLAN is a local area network (LAN) that extends beyond a single physical LAN segment. It is configured by software and may be extended to include many LAN segments.

Figure 1:
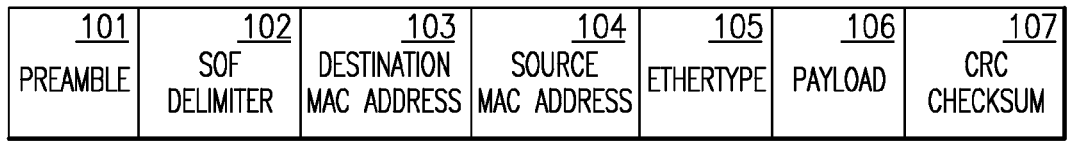
FIG. 1 illustrates one embodiment of a data packet in accordance with one or more aspects of an embodiment of the present invention.

One embodiment of a data packet sent across the network in accordance with one or more aspects of an embodiment of the present invention is described with reference to FIG. 1. In this example, the Ethernet frame 100 (data packet) includes a Preamble 101, an SOF (Start of frame delimiter) 102, Destination MAC (Media Access Control) Address 103, Source MAC address 104, Ethertype 105, Payload 106, and CRC (cyclic redundancy code or cyclic redundancy check) 107. In one embodiment, the Preamable 101 allows devices on the network to detect a new incoming Ethernet frame. In another embodiment, the Preamble 101 may not used. The SOF 102 marks the end of the Preamble. The Destination MAC address 103 is the address of the receiving device, while the Source MAC address is the address of the sending device. The Ethertype 105 may be used in an embodiment of the present invention to store a tag identifying a packet as related to another packet. This is just an example of where a tag may be stored and is not limited to only the Ethertype field. The Payload 106 is the user data. The CRC Checksum 107 is used to detect accidental changes in the packet, for example the header, payload, the CRC itself, etc.

Figure 2:
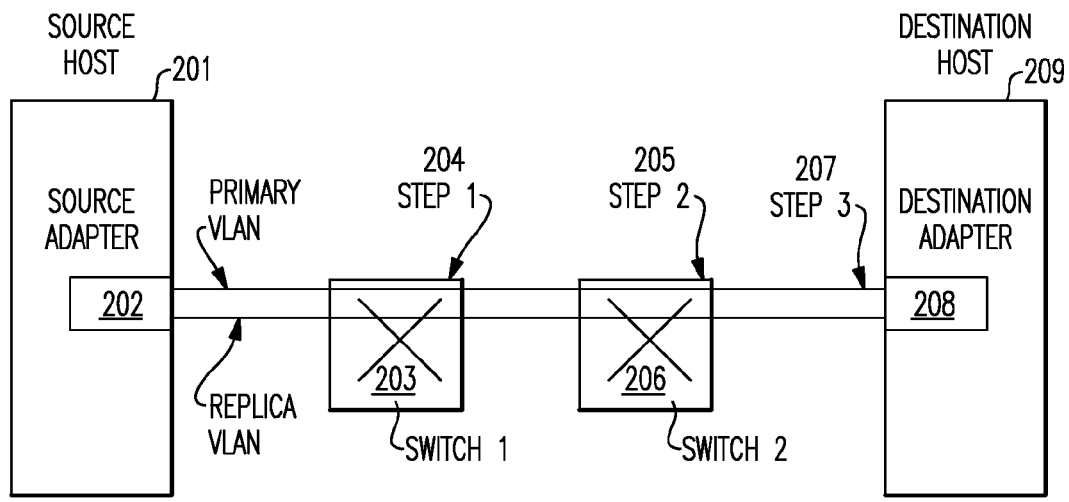
FIG. 2 illustrates one embodiment of a primary and redundant VLAN in accordance with one or more aspects of an embodiment of the present invention.

One embodiment of a primary and redundant (replica) VLAN setup in accordance with one or more aspects of an embodiment of the present invention is described with reference to FIG. 2. This embodiment of the VLAN setup protocol uses known resource discovery methods to find available switches that respond to pings and healthy switch OS (operating system) queries from source host to destination host. Redundant VLANs may be setup to use internal component resources from a source host to a destination host, which may include computer and memory resources in host adapters and switches (switch port cards). For example, setting up the VLANs may include sending a control packet (resource reservation packet) from the source host 201 through the source adapter 202 to Switch 1 203 at step 1 204. Buffers and output ports in Switch 1 203 are reserved. At step 2 205, the control packet is sent from the source adapter 202 to switch 2. Buffers and output ports in Switch 2 206 are reserved. At step 3 206, the control packet is sent from Switch 2 206 to destination adapter 208 with buffer and output port reservation. The destination host 209 contains destination adapter 208. The resource reservation packet from the source adapter 202 to each switch 203, 206 or destination adapter 208 terminates at the destination adapter 208. An ACK (acknowledgement) packet is sent back from the destination port 208 to the source adapter 202 to reserve resources across the return path and terminates at the source adapter 202. In one embodiment, the ACK is used only to reserve resources at the source host 201.

It should be understood that in an embodiment of the primary and redundant VLAN in accordance to one or more aspects of an embodiment of the present invention, that the packet steered along the primary VLAN is called the primary packet and the packet steered along the replica VLAN is called the replica packet. A group of packets treated as a unit for checking purposes is termed a granularity group. This is the unit or granularity at which checking may be performed. This allows for better performance at the expense of larger output port buffer size because checking is performed over a group of packets rather than a single packet. It also allows single packet timing jitter to not affect time-window based arrival matching. In one embodiment, primary and replica packets may be routed through the network across separate connections (pipelines, or buses). In another embodiment, primary and replica packets may be routed through the network across a single connection.

The above embodiment of a redundant VLAN setup protocol may reserve resources from the source host adapter, intermediate switch port cards and terminate at a destination host adapter depending on the method chosen—(i) spatial resource multiplexing or (ii) temporal resource multiplexing.

Figure 3:
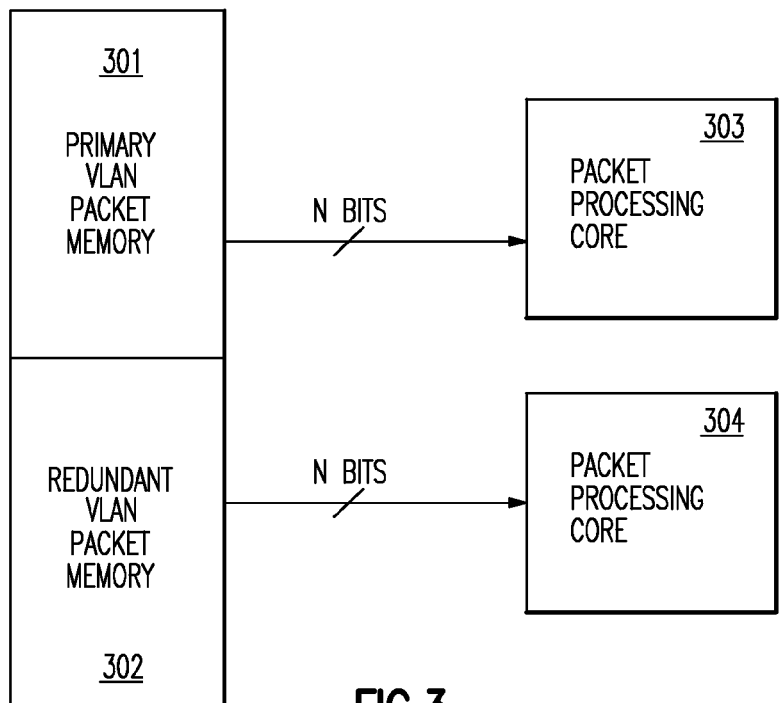
FIG. 3 illustrates an embodiment of spatial resource multiplexing for a primary and redundant VLAN in accordance with one or more aspects of an embodiment of the present invention.

Further details relating to an embodiment of spatial resource multiplexing for a primary and redundant VLAN are described with reference to FIG. 3. In this embodiment, separate cores 303, 304 and separate packet memories 301, 302 may be used for each of the primary and redundant VLAN. Cores 303, 304 may be processors. In a typical processor chip, there may be several cores. Cores do not have to be identical, as there may be specialized cores and general purpose cores. Assuming N bits are chosen by a designer, all bits from the packet memory 301, 302 are sent into the packet processing core 303, 304 at a rate of N bits at a time. The packets from each VLAN memory 301, 302 are processed on two physically distinct cores 303, 304 concurrently. This allows packets, which include primary and replica packets, at primary and redundant VLANs to be processed at high performance (spatial resource multiplexing). In order to avoid bit-flip errors that may jointly affect primary and replica packet processing, both primary and replica packets may not be allowed to be processed concurrently on the same network processing core or pipelined concurrently on the same core.

Figure 4:
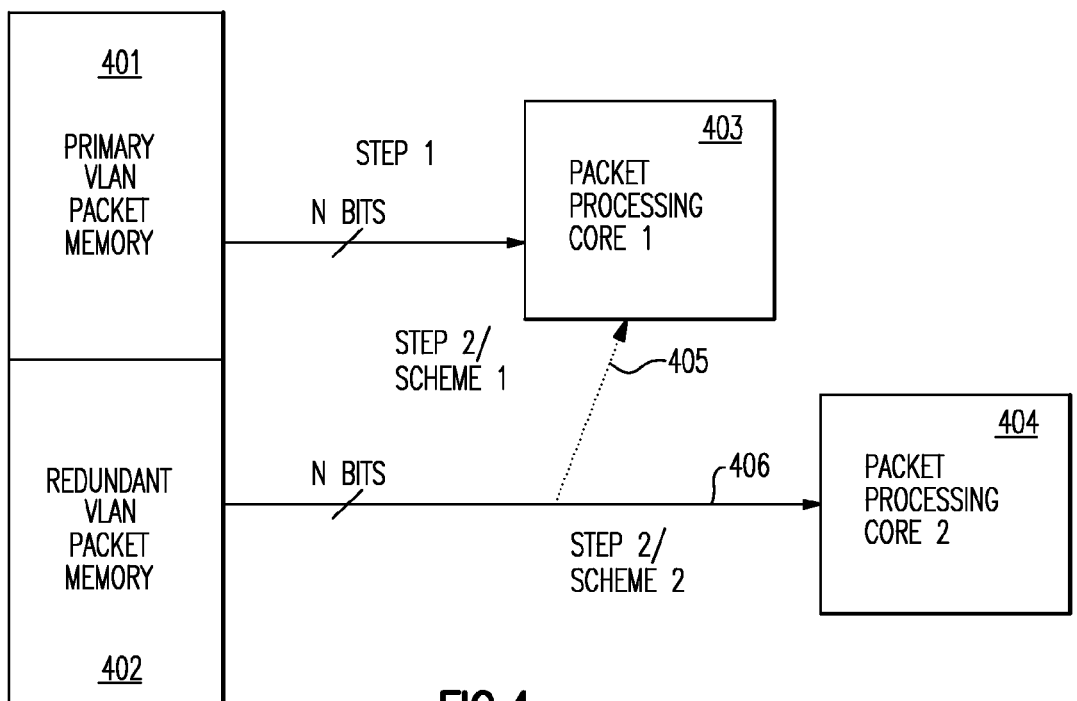
FIG. 4 illustrates an embodiment of temporal resource multiplexing for a primary and redundant VLAN for use in one or more aspects of an embodiment of the present invention.

Further details relating to an embodiment of temporal resource multiplexing for a primary and redundant VLAN are described with reference to FIG. 4. This embodiment includes two different methods. In both methods, all bits from the packet memory 401, 402 are sent into a particular packet processing core 403, 404, specified by the particular method, at a rate of N bits at a time, where N bits may be chosen by a designer.

In the first method, primary and replica packets are processed serially on the same packet processing core 403. This means that a primary packet from primary VLAN packet memory 401 will be processed in one core of a packet processing engine, packet processing core 1 403. After the packet processing core 1 403 has completed processing the primary packet, the replica packet from redundant VLAN packet memory 402 will be processed (temporal resource multiplexing) on that same core, packet processing core 1 403. The dotted arrow 405 in FIG. 4 represents what happens in this particular method and shows that the replica packets from redundant VLAN packet memory 402 are directed towards packet processing core 1 403.

In the second method, the primary packet from primary VLAN packet memory 401 is processed by packet processing core 1. The replica packet from redundant VLAN packet memory 402 is processed sequentially by packet processing core 2, as shown by arrow 406 in FIG. 4. This providing temporal resource multiplexing. This second method allows an embodiment of the invention to be more resilient to hard and soft errors.

Figure 5:
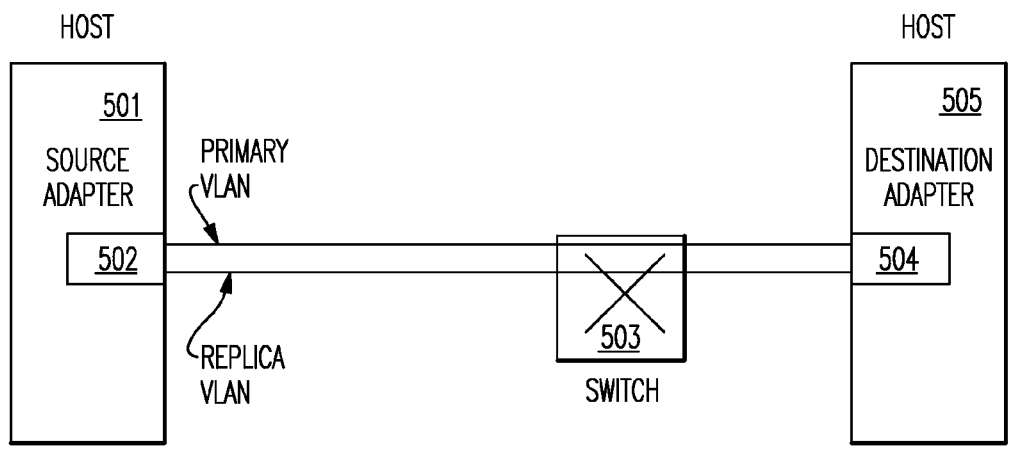
FIG. 5 illustrates one embodiment of per-switch checking in accordance with one or more aspects of an embodiment of the present invention.

One embodiment of per-switch checking to detect and recover from soft errors in a network in accordance with one or more aspects of an embodiment of the present invention is described with reference to FIG. 5. This embodiment is useful when a single switch 503 exists between hosts 501, 506. The switch 503 may be a sub-component of a router that forwards packets to external datacenter hosts or the endpoint of a VLAN, where the endpoint of the VLAN is a device that does not have enough resources to check packets, e.g. non-compute devices, energy appliances, wireless devices etc. For this method to work, the switch 503 must support output port queueing. The primary packet is sent from the source host 501 through source adapter 502. The primary packet arrives at the input port of the switch 503 and is steered to the output port of the switch 503. Any bit-flips in the control of the cross-bar/shared memory control will send packets to output ports that are outside the VLAN and will be discarded. A primary packet is steered to an output port and waits for its partner replica packet or vice-versa. If a predetermined time interval (may be designer chosen for a particular workload or packet stream) expires, the packet that first arrived has a tag set, i.e in its Ethertype field, to indicate that checking was not complete. This means that the partner packet (primary or replica) either got mis-steered to a different output port or got corrupted and dropped in the switch 503, perhaps due to undetected soft errors in the control plane/operating OS or data plane. In order to recover from this situation, two schemes are possible: (1) the packet is dropped on the switch 503, and upper layer protocols on the destination host 505 may directly request packets from the original source host 501 across redundant VLANs; or (2) the packet is forwarded to the destination host 505 to allow diagnostic determination of switch soft errors. It will be understood that the checking can be done on an individual packet basis or across a group of packets, i.e Ethernet packets, on the output port. If the primary and replica packets arrive at the output port of switch 503 within the predetermined time interval, the packets have a tag set to indicate that checking was complete. The packets are then sent to the destination adapter 504 located in destination host 505.

Figure 6:
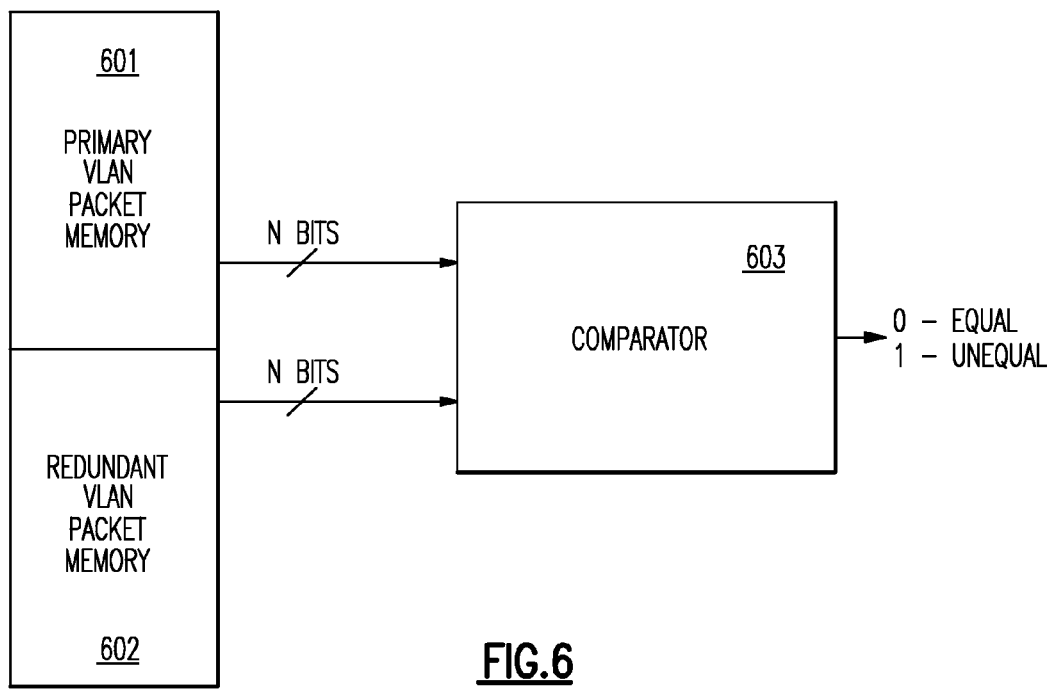
FIG. 6 illustrates one embodiment of a micro-architecture view of per switch checking in accordance with one or more aspects of an embodiment of the present invention.

Further details relating to a micro-architecture view of per switch checking is described with reference to FIG. 6. In particular, FIG. 6 illustrates the output port of switch 503 described in FIG. 5. All bits from the packet memory 401, 402 are sent into the comparator 603 at a rate of N bits at a time, where N bits may be chosen by a designer. The comparator 603 outputs a 0 or a 1 depending on whether the packet contents are equal or unequal. For example, if the primary packet contents are identical to the replica packets, then a 0 is outputted. If they are not identical, a 1 is outputted. This is used by the switch to determine whether or not to discard the packets or to send them on to their destination. The comparator 603 may be implemented in hardware or software.

Figure 7:
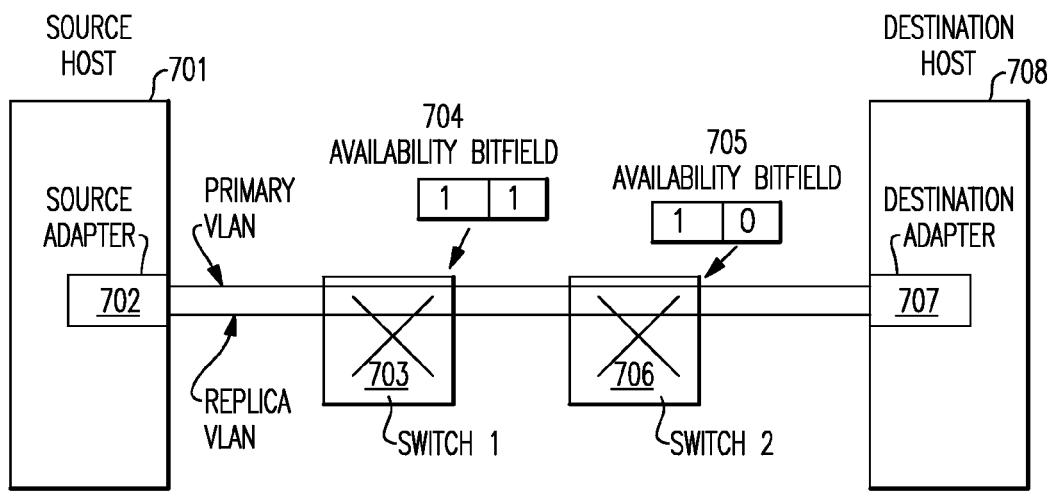
FIG. 7 illustrates one embodiment of end to end checking with per-switch match in accordance with one or more aspects of an embodiment of the present invention.

FIG. 7 describes one embodiment according to one or more aspects of an embodiment of the present invention that utilizes an end to end checking with per-switch match to detect and recover from soft errors. In this embodiment, a bit field 704, 705 may be maintained in, but not limited to, the Ethertype field 105 of the Ethernet packet, as described in FIG. 1. Each bit in the Ethertype field 105 corresponds to a switch position in the VLAN connection from one end host (source host 701) to another end host (destination host 708), e.g. a first switch would correspond to the first bit in the Ethertype field, a second switch would correspond to the second bit in the Ethertype field, etc. A bit is set ('1') when the packet is on a switch 703, 706 if the primary packet and replica packet arrive at an output port of that switch 703, 706 within a predetermined time window. Upon reaching the destination host 708, the position corresponding to the first reset ('0') bit is the switch 703, 706 in the connection with possible availability or soft error issues. This switch identifier is stored in memory at the destination host 708. If the primary and replica packet both arrive at the destination host 708, the bit corresponding to the switch position may have possibly been reset because of timing issues or cross-traffic. If only one of the packets arrive then upper layer protocols on the destination host 708 will cause retransmission. Upon a first retransmission, if only one of the primary and replica packets arrive once again at the switch 703, 706 and the same bit position in the bitfield is reset, then another retry is made. If this retry also fails then VLANs may need to reconfigured to bypass the faulty switch. This faulty switch (corresponding to the same bit position or switch identifier after a certain number of tries) is tested by the VLAN/subnet manager by possible control OS rebooting and other tests. If it fails the tests, the switch is taken offline for servicing. Otherwise it is made online and the VLAN is setup to include the repaired switch. This example embodiment is useful for a single packet, a group of packets, or a variety of other packets in a granularity group.

Figure 8:
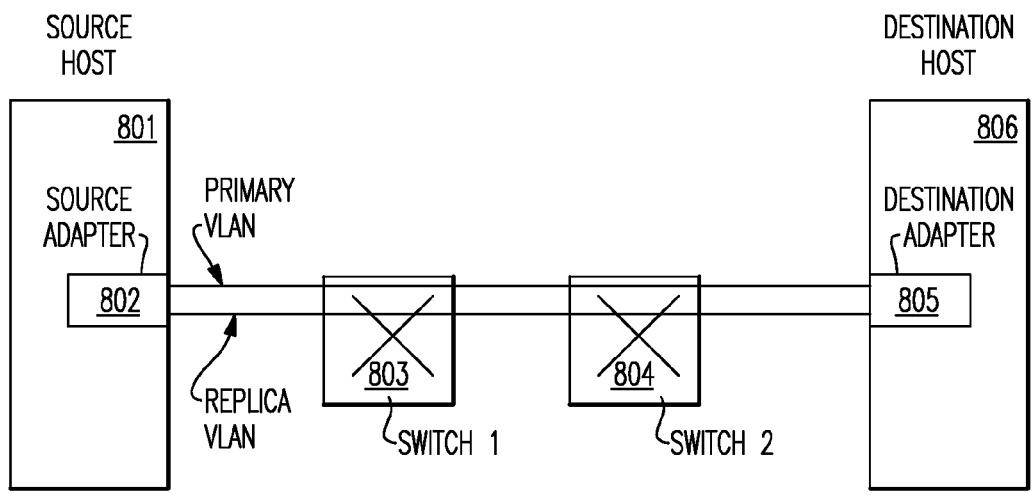
FIG. 8 illustrates one embodiment of end to end checking without per-switch match in accordance with one or more aspects of an embodiment of the present invention.

FIG. 8 describes one embodiment according to one or more aspects of an embodiment of the present invention that utilizes end to end checking without per-switch match to detect and recover from soft errors. In this embodiment, a source host 801 through its corresponding source adapter 802 sends packets, e.g. Ethernet packets, to a destination along switches 803, 804 in a connection. The destination adapter 805 at a destination host 806 matches Ethernet sequence numbers (tags) between primary and replica packets. For a given sequence number, if the primary and replica both do not arrive at a destination adapter 805 within a predetermined time window, the primary Ethernet packet is dropped at the destination adapter 805. This allows upper layer protocols on the destination host 806 processor to request retransmission. For group-level granularity, if a primary or replica group arrives outside a time-window and a request for retransmission corresponding to the group is currently in progress then the arrival of the "late" group can cancel the upper layer protocol retransmission request. This saves bandwidth and helps with overall application response time and forward progress. It will be noted that the destination adapter 805 may actually perform the match function on the destination host 806 processor, which traditionally has better FIT (failures in time) rates than adapter hardware resources. If retransmission requests fail a certain number of times, a redundant VLAN setup protocol identifies switches that are available and sets up VLANs bypassing unavailable switches. In one embodiment, the certain number of times a retransmission request may fail is up to three times.

Figure 9:
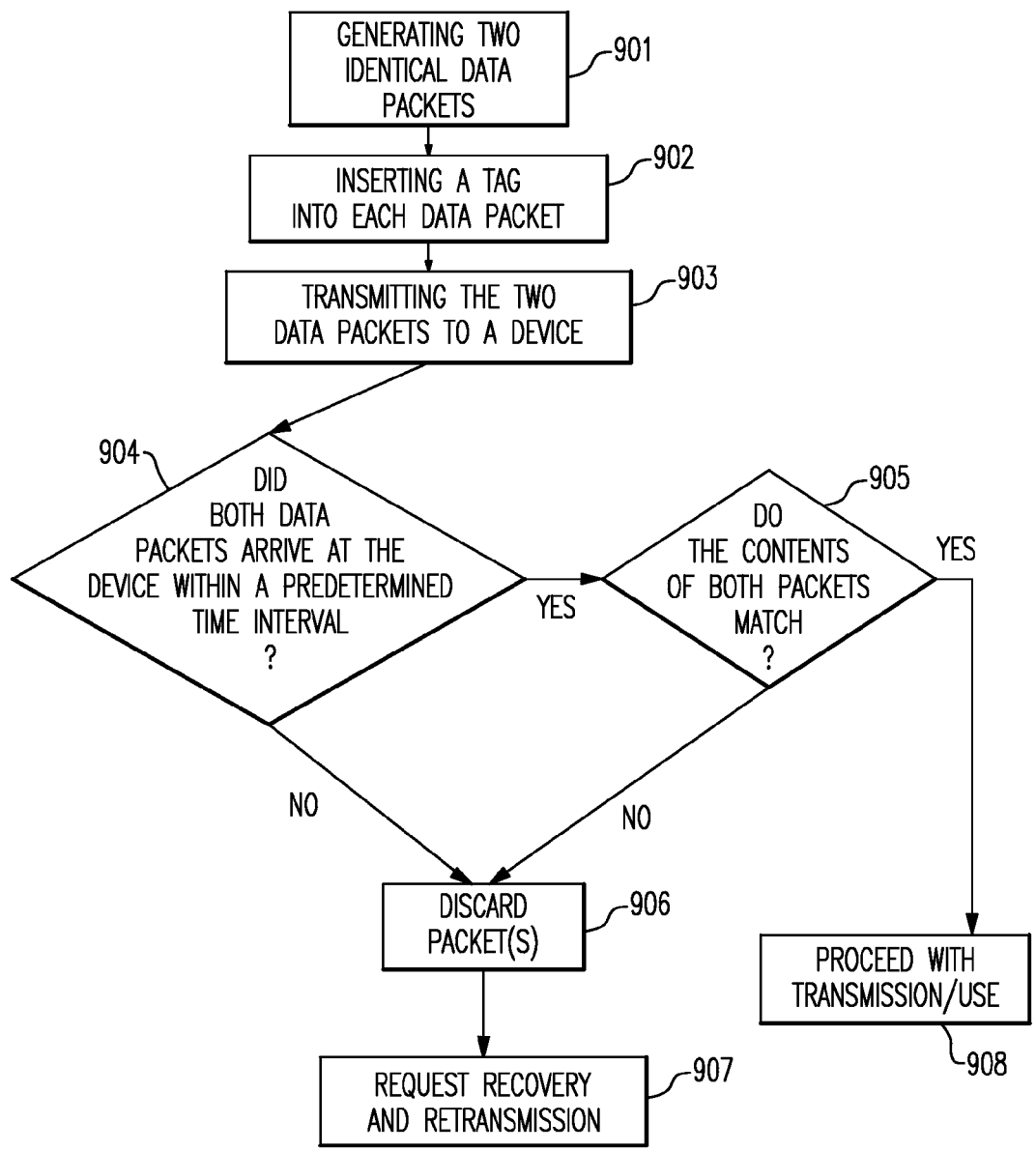
FIG. 9 illustrates an embodiment of a process incorporating one or more aspects of an embodiment of the present invention.

FIG. 9 illustrates an embodiment of a flow diagram incorporating one or more aspects of an embodiment of the present invention. In 901, a sending device, e.g. a source host, source adapter, etc., generates two duplicate or identical data packets. A tag is inserted into each data packet to indicate that they are duplicates of one another 902. The tag may be inserted into, but not limited to, an Ethernet field of the packet. The two data packets are transmitted to a receiving device 903. For example, the data packets may be routed to the same output port of a switch, to a destination host, a destination adapter, etc. A determination may be made at the receiving device to see if the received data packets are identical in 904 and 905. In 904, a determination is made to check if both data packets arrived at the receiving device within a predetermined time interval. This determination may be performed by examining the tags in accordance to the embodiments previously discussed above in reference to FIG. 5-7. If the data packets did not arrive within the predetermined time interval, the packets are discarded 906. Recovery and retransmission of the data packets will be requested 907 by the receiving device, for example, by the upper layer protocols of the receiving host, the receiving adapter, or the switch itself. In one embodiment, only the receiving host, through its upper layer protocol processing abilities, may request recovery and retransmission of the data packets.

If both data packets arrive within the predetermined time interval, the contents of both packets are compared 905. If the contents of both packets do not match, then the packets are discarded 906, and the receiving device, for example the destination host, the destination adapter, or the destination host, requests recovery and retransmission of the packets 907. In one embodiment, a switch sets/resets the availability bit field, for example bit field 704 in FIG. 7, and forwards the packet onwards, while the destination adapter uses its upper layer protocols to request retransmission. If the contents of both packets do match, then the receiving device will proceed with transmission or use of the data packets 908, depending on the type of receiving device, e.g. a switch, a host, a host adapter, etc.

It should be noted that if only one packet arrives at the receiving device within the predetermined time interval, the data packet will be discarded. In one embodiment, switches may forward this packet with the availability bit field, for example bit field 704 in FIG. 7, to detect a switch in error. Recovery and retransmission of the data packets will be requested pursuant to the process previously discussed above.

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, the embodiments of present invention may be embodied as a system, method or computer program product. Accordingly, the embodiments of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the embodiment of present invention may take the form of a computer program product embodied in any tangible medium of expression having computer usable program code embodied in the medium.

Figure 10:
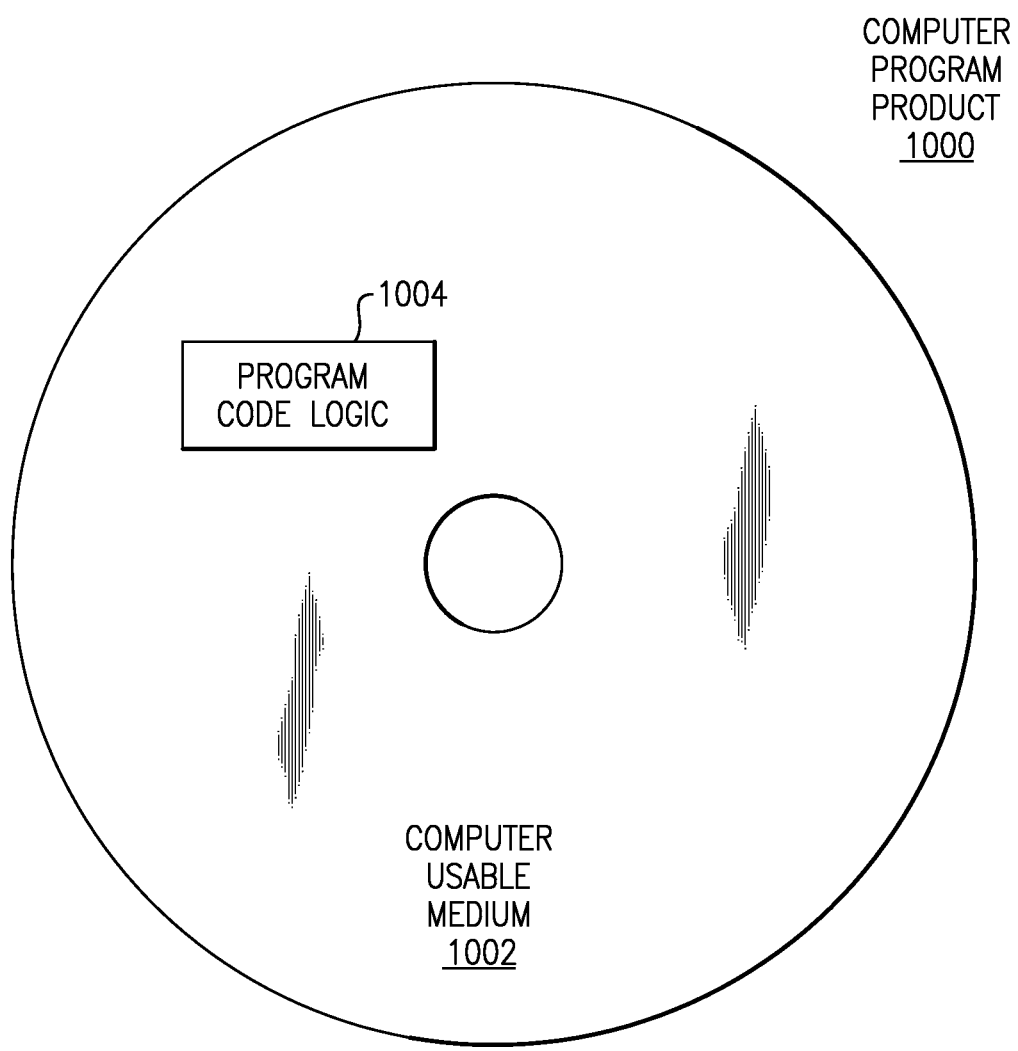
FIG. 10 illustrates one embodiment of a computer program product to incorporate one or more aspects of an embodiment of the present invention.

One example of a computer program product incorporating one or more aspects of an embodiment of the present invention is described with reference to FIG. 10. A computer program product 1000 includes, for instance, one or more computer usable media 1002 to store computer readable program code means or logic 1004 thereon to provide and facilitate one or more aspects of an embodiment of the present invention. Any combination of one or more computer usable or computer readable medium(s) may be utilized. The computer-usable or computer-readable medium may be, for example but not limited to, an electronic, magnetic, optical, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a computer-usable or computer-readable medium may be any storage medium that can contain or store the program for use by or in connection with the instruction execution system, apparatus, or device.

Computer program code for carrying out operations of the embodiment of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 11:
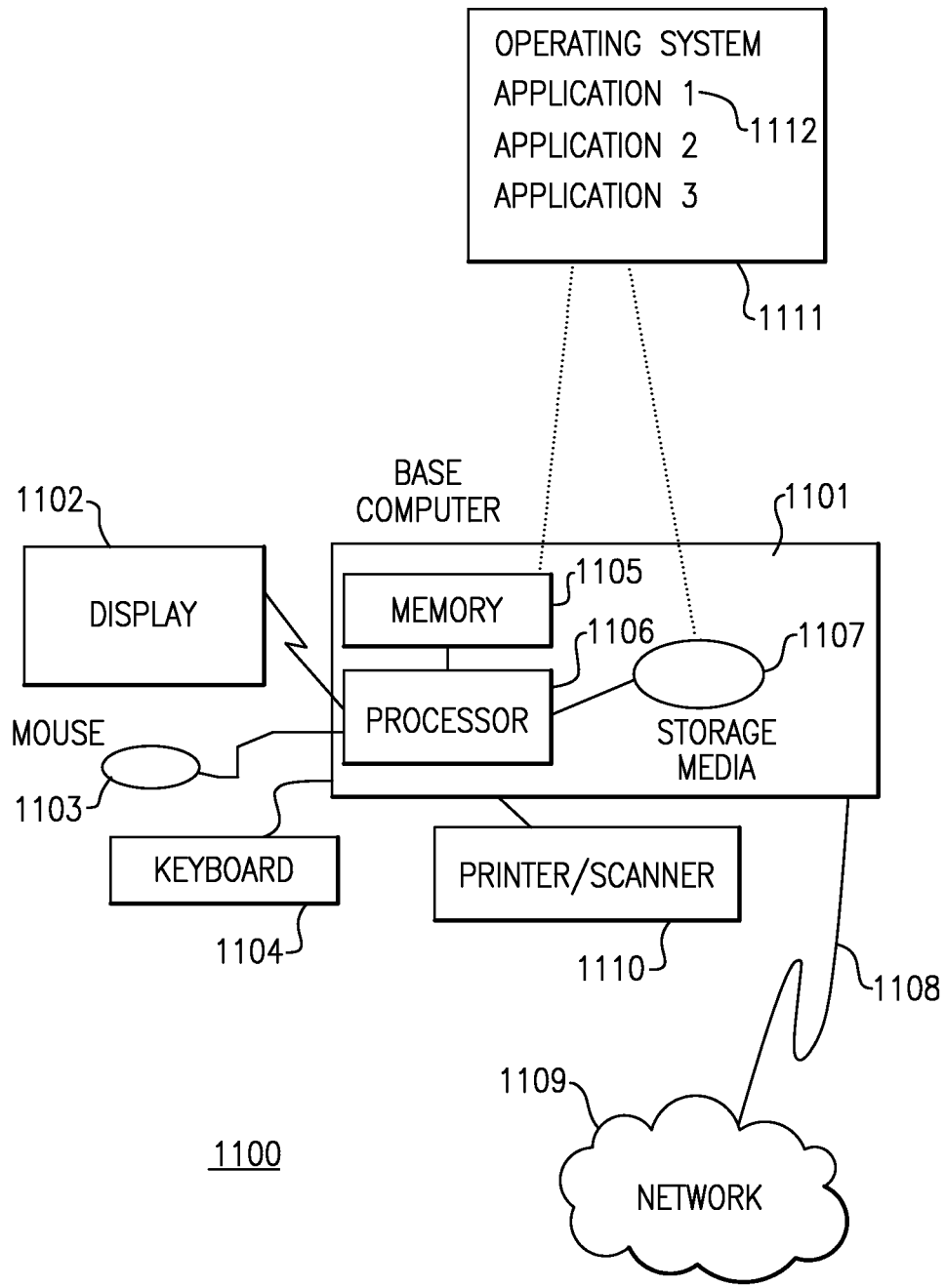
FIG. 11 illustrates one embodiment of a computer system in which an embodiment of the present invention may be practiced.

FIG. 11 illustrates an embodiment of a workstation, server hardware system, in which an embodiment of the present invention may be practiced. The system comprises a computer system 1101, such as a personal computer, a workstation, a server or host, such as the source host 201 and destination host 209 as illustrated in FIG. 2, including optional peripheral devices. The computer system 1101 includes one or more processors 1106 and a bus employed to connect and enable communication between the processor(s) 1106 and the other components of the computer system 1101 in accordance with known techniques. The bus connects the processor 1006 to memory 1005 and long-term storage 1107 which can include a hard drive (including any of magnetic media, CD, DVD and Flash Memory for example) or a tape drive for example. The computer system 1101 might also include a user interface adapter, which connects the microprocessor 1106 via the bus to one or more interface devices, such as a keyboard 1104, mouse 1103, a printer/scanner 1110 and/or other interface devices, which can be any user interface device, such as a touch sensitive screen, digitized entry pad, etc. The bus also connects a display device 1102, such as an LCD screen or monitor, to the microprocessor 1106 via a display adapter.

The computer system 1101 may communicate with other computers or networks of computers by way of a network adapter capable of communicating 1108 with a network 1109. For example, network adapters may include communications channels, token ring, Ethernet or modems. Alternatively, the computer system 1101 may communicate using a wireless interface, such as a CDPD (cellular digital packet data) card. The computer system 1101 may be associated with such other computers in a Local Area Network (LAN), VLAN, or a Wide Area Network (WAN), or the computer system 1101 may be a client in a client/server arrangement with another computer, etc. All of these configurations, as well as the appropriate communications hardware and software, are known in the art.

Software programming code which embodies the present invention may be typically accessed by the processor 1106 from long-term storage media 1107. The software programming code may be embodied on any of a variety of known media for use with a data processing system, as previously described above with reference to FIG. 10. The code may be distributed on such media, or may be distributed to users from the memory or storage of one computer system over a network to other computer systems.

Alternatively, the programming code 1111 may be embodied in the memory 1105, and accessed by the processor 1106 using the processor bus. Such programming code may include an operating system which controls the function and interaction of the various computer components and one or more application programs 1112. Program code may be normally paged from storage media 1107 to memory 1105 where it may be available for processing by the processor 1106. The techniques and methods for embodying software programming code in memory, on physical media, and/or distributing software code via networks are well known and will not be further discussed herein. The computer program product medium may be typically readable by a processing circuit preferably in a computer system for execution by the processing circuit.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow.

What is claimed is:

1. A method for detecting and recovering from soft errors in a network comprising a first device, said method comprising:
   receiving, by a first device, a first data packet, said first device comprising a virtual local area network (VLAN) input port, an output port and a comparator, said first data packet comprising a first tag, said first tag indicating that said first data packet is associated with a second data packet;
   responsive to receiving said second data packet, determining, by said first device, whether said first data packet and said second data packet are identical, said second data packet comprising a second tag, said second tag indicating that said second data packet is associated with said first data packet, said determining comprising:
      determining, by said first device, whether said first data packet and said second data packet arrive at said output port within a predetermined time interval, said determining by said first device resulting in a modification of a bit in said first device; and
      determining, by said comparator, whether said first data packet and said second data packet have identical content, said determining by said comparator resulting in an output comprising a bit parity; and
   responsive to said determination that said first data packet and said second data packet are not identical, discarding said first data packet and said second data packet at said first device, and requesting retransmission of said first data packet and said second data packet.

2. The method according to claim 1, wherein said network further comprises a second device; and
   wherein said method further comprises:
      generating, by said second device, said first data packet and said second data packet; and
      transmitting said first data packet and said second data packet from said second device to said first device.

3. The method according to claim 2, wherein generating said first data packet and said second data packet comprises inserting a said first tag into said first data packet and said second tag into said second data packet to indicate that said first data packet and said second data packet are associated.

4. The method according to claim 2, wherein said first device and said second device are virtual local area network (VLAN) enabled switches.

5. The method according to claim 1, wherein said first data packet and said second data packet comprise an Ethernet field for storing said first tag or said second tag.

6. The method according to claim 1, wherein said determination of whether said first data packet and said second data packet arrive at said first device within said predetermined time interval comprises determining whether said first tag or said second tag for said first data packet and said second data packet are identical.

7. The method according to claim 1, further comprising:
responsive to said determination that said first data packet and said second data packet did not arrive at said first device within said predetermined time interval, discarding said first data packet and said second data packet at said first device, and requesting retransmission of said first data packet and said second data packet.

8. The method according to claim 1, further comprising:
responsive to a determination that only said first data packet or only said second data packet arrived at said first device within said predetermined time interval, discarding said first data packet or said second data packet at said first device, and requesting retransmission of said first data packet and said second data packet.

9. The method according to claim 1, wherein said network is a Converged Enhanced Ethernet (CEE) network or a Fibre Channel over Ethernet (FCoE) network.

10. The method according to claim 1, the method further comprising:
responsive to said determination that said first data packet and said second data packet are identical, processing, at said first device, at least one of said first data packet, said second data packet, or a combination thereof.

* * * * *